United States Patent [19]

Maekawa

[11] Patent Number: 5,838,250
[45] Date of Patent: Nov. 17, 1998

[54] REMOTE-CONTROL APPARATUS AND IMAGE INPUT APPARATUS

[75] Inventor: Yoshito Maekawa, Kanagawa-ken, Japan

[73] Assignee: Canon Kabushiki Kaisha, Tokyo, Japan

[21] Appl. No.: 867,176

[22] Filed: Jun. 2, 1997

Related U.S. Application Data

[63] Continuation of Ser. No. 345,478, Nov. 28, 1994, abandoned.

[30] Foreign Application Priority Data

Dec. 2, 1993 [JP] Japan .................................. 5-302908

[51] Int. Cl.$^6$ ...................................................... H04Q 1/00
[52] U.S. Cl. ................................ 340/825.07; 340/825.72; 348/143
[58] Field of Search ......................... 340/825.17, 825.06, 340/825.69, 825.72, 825.07; 455/92; 379/102; 348/143

[56] References Cited

U.S. PATENT DOCUMENTS

| | | | |
|---|---|---|---|
| 4,885,766 | 12/1989 | Yasuoka et al. | 379/105 |
| 4,959,713 | 9/1990 | Morotomi | 340/825.06 |
| 5,086,385 | 2/1992 | Launey | 379/102 |
| 5,109,222 | 4/1992 | Welty | 340/825.72 |
| 5,218,627 | 6/1993 | Corey | 379/102 |
| 5,382,943 | 1/1995 | Tanaka | 348/143 |
| 5,414,761 | 5/1995 | Darbee | 379/102 |

FOREIGN PATENT DOCUMENTS

2128842  5/1984  United Kingdom .

Primary Examiner—Brian Zimmerman
Attorney, Agent, or Firm—Robin, Blecker & Daley

[57] ABSTRACT

A remote-control apparatus for remotely controlling one or more controlled apparatuses includes a video camera capable of inputting an image of a controlled apparatus and outputting the input image to outside the remote-control apparatus, and a controller for controlling the controlled apparatus the image of which has been input by the video camera, by using a wireless signal. The video camera and the controller are disposed in one body.

11 Claims, 6 Drawing Sheets

REMOTE-CONTROL APPARATUS AND IMAGE INPUT APPARATUS

This is a continuation of application under 37 CFR 1.62 of prior application Ser. No. 08/345,478, filed Nov. 28, 1994, now abandoned.

BACKGROUND OF THE INVENTION

1. Field of the Invention

The present invention relates to a remote-control apparatus for remotely controlling controlled apparatuses, such as electrical apparatuses, and an image input apparatus.

2. Description of the Related Art

Remote-control systems which remotely control electrical apparatuses, such as in-house electrical apparatuses, through communication lines such as telephone lines, are known. In a certain system, a wireless communication line (employing, for example, electromagnetic waves, or infrared rays) is disposed between a telephone set, specifically an automatic answering telephone set, and a controlled apparatus. A predetermined control signal (for example, a control signal in accordance with DTMF (Dual Tone Multi Frequency)) is transmitted to the telephone set from an outside place where the user is located, and a wireless control signal corresponding to the control signal received by the telephone set is transmitted to the controlled apparatus. As a result, it is possible to remotely control controlled apparatuses, such as in-house air conditioners or baths from the outside place where the user is located.

Of course, by using the electromagnetic waves at an appropriate frequency band, it is possible to remotely control an arbitrary specific controlled apparatus from among a plurality of controlled apparatuses in which the receiver is at least within a fixed distance from the telephone set.

A wired connection arrangement called a home bus rather than wireless connection is known. However, in the case of the wired connection method, a wiring work must be done beforehand, and there is also a drawback in that it is difficult to cope with the change in the position of the controlled apparatus and the expansion thereof. In contrast, the wireless method has no wiring requirement and has the advantage of being capable of flexibly coping with the change in the position of the controlled apparatus and the expansion thereof.

However, in the conventional wireless method, if directivity is made wider, interference or electric wave disorder may occur, and a controlled apparatus in the house next door may be caused to operate depending on the intensity of the electric wave.

To avoid the above problem, infrared rays or microwaves are usually used at a relatively sharp directivity. This, however, causes an inconvenience in that the position at which a controlled apparatus or a telephone set is installed is limited. Further, when a plurality of controlled apparatuses are to be controlled, the receivers of the respective controlled apparatuses must be disposed on the same line.

SUMMARY OF THE INVENTION

The present invention aims to solve the above-described problems of the prior art. It is an object of the present invention to provide an apparatus capable of monitoring one or more controlled apparatuses from a remote place in the form of a video image and which is capable of easily confirming the operation of the controlled apparatus before and after the remote operation at a remote place.

It is another object of the present invention to provide an apparatus capable of operating in such a way that the controlled apparatus to be remotely controlled can be intuitively known and can be operated as if a specific controlled apparatus was remotely controlled.

It is a further object of the present invention to provide an apparatus in which there is no limitation on the position of a controlled apparatus and a plurality of controlled apparatuses can be controlled.

To achieve the above-described object, according to one aspect of the present invention, there is provided a remote-control apparatus for remotely controlling one or more controlled apparatuses, comprising image input means for inputting an image of a controlled apparatus, control means for controlling the controlled apparatus the image of which has been input by the image input means, and image transmitting means for outputting the image input by the image input means to outside the remote-control apparatus.

According to another aspect of the present invention, there is provided a remote-control apparatus for remotely controlling one or more controlled apparatuses by using a wireless signal, comprising transmitting means for transmitting a control signal to a controlled apparatus, transmission destination control means for controlling the direction of the control signal transmitted by the transmitting means, and control signal receiving means for receiving a control signal for the transmission destination control means through a communication line.

According to a further aspect of the present invention, there is provided a remote-control apparatus for remotely controlling one or more controlled apparatuses by using a wireless signal, comprising image input means for inputting an image of a controlled apparatus, image transmitting means for outputting the image input by the image input means to outside the remote-control apparatus, drive control means for driving and controlling the image input means, first receiving means for receiving a first control signal for the drive control means from outside the remote-control apparatus, second receiving means for receiving a second control signal for instructing a remote operation for the one or more controlled apparatuses from outside the remote-control apparatus, conversion means for converting the second control signal received by the second receiving means into a remote-control signal for the one or more controlled apparatuses, and output means for outputting the remote control signal converted by the conversion means in the form of a wireless signal.

According to a still further aspect of the present invention, there is provided an image input apparatus, comprising image input means for inputting an image of an object, control means for controlling one or more controlled apparatuses by using a wireless signal, and image transmitting means for outputting the image input by the image input means to outside the image input apparatus.

According to a still further aspect of the present invention, there is provided a remote-control apparatus for remotely controlling one or more controlled apparatuses by using a wireless signal, comprising orientation storing means for storing the orientation of each of the one or more controlled apparatuses, control signal output means for outputting a control signal for a controlled apparatus in the form of a wireless signal, and orientation change means for changing the orientation of an output of the control signal output means to the orientation of the controlled apparatus to be controlled, by referring to the orientation storing means in accordance with the selection of the controlled apparatus to be controlled.

The above and further objects, aspects and novel features of the invention will more fully appear from the following detailed description when read in connection with the accompanying drawings. It is to be expressly understood, however, that the drawings are for the purpose of illustration only and are not intended to limit the invention.

DETAILED DESCRIPTION OF THE PREFERRED EMBODIMENTS

Preferred embodiments of the present invention will be explained below with reference to the accompanying drawings.

Figure 1:
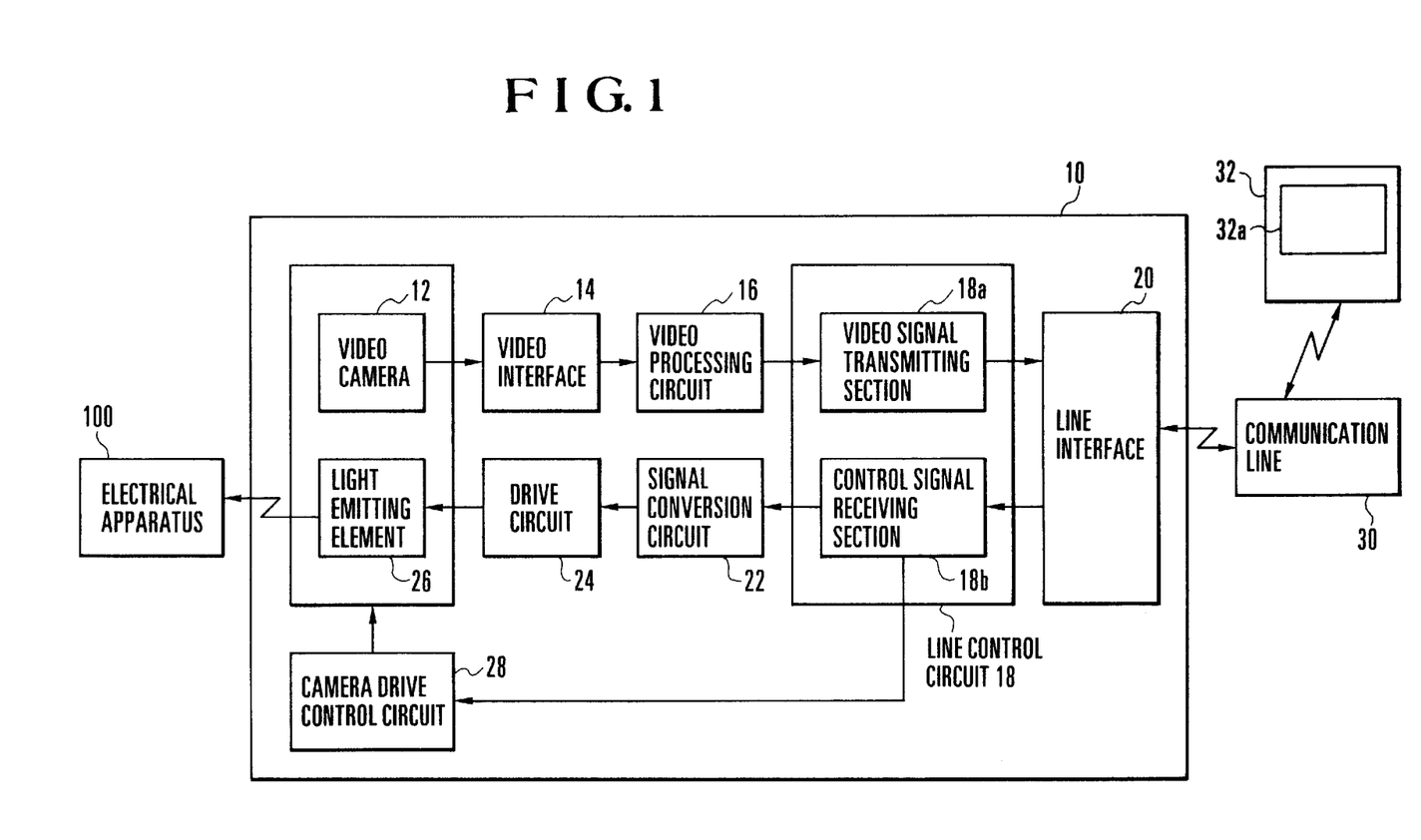
FIG. 1 is a block diagram illustrating the schematic construction of a first embodiment of the present invention.

FIG. 1 shows a block diagram of the schematic construction of a first embodiment of the present invention. Referring to FIG. 1, reference numeral 10 denotes a remote-control apparatus of the first embodiment of the present invention, reference numeral 12 denotes a video camera which, in addition to being used as a video telephone set to take an image of a user, is used as a monitor camera during a remote operation, reference numeral 14 denotes a video interface for converting video signals output from the video camera 12 into a predetermined internal format, and reference numeral 16 denotes a video processing circuit for performing filtering and encoding on the output of the video interface 14.

Reference numeral 18 denotes a line control circuit for controlling communications over a communication line, which circuit comprises a video signal transmitting section 18a for transmitting the output from the video processing circuit 16 and a control signal receiving section 18b for receiving various control signals, such as DTMF, from the communication line. The line control circuit 18 is connected to a communication line 30 via a line interface 20.

Reference numeral 22 denotes a signal conversion circuit for converting the output of the control signal receiving section 18b into the signal format of a remote control signal for a specific electrical apparatus to be controlled, and reference numeral 24 denotes a drive circuit for driving a light emitting element 26 in accordance with the output from the signal conversion circuit 22. The light emitting element 26 outputs an infrared wireless control signal when the light emitting element 26 is driven by the drive circuit 24. In addition to the infrared ray, microwaves, radio waves or ultrasonic waves may be used. However, infrared rays are commonly used to remotely control in-house electrical apparatuses, and the degree of use is high.

The light emitting element 26 is formed integrally with the video camera 12, and always directs the same orientation as that of the video camera 12.

Reference numeral 28 denotes a camera drive control circuit for controlling the orientation, focus and zoom of the video camera 12 in accordance with the camera control signal received over the communication line 30. The camera control signal is separated from the received signal by the control signal receiving section 18b and supplied to the camera drive control circuit 28.

Figure 2:
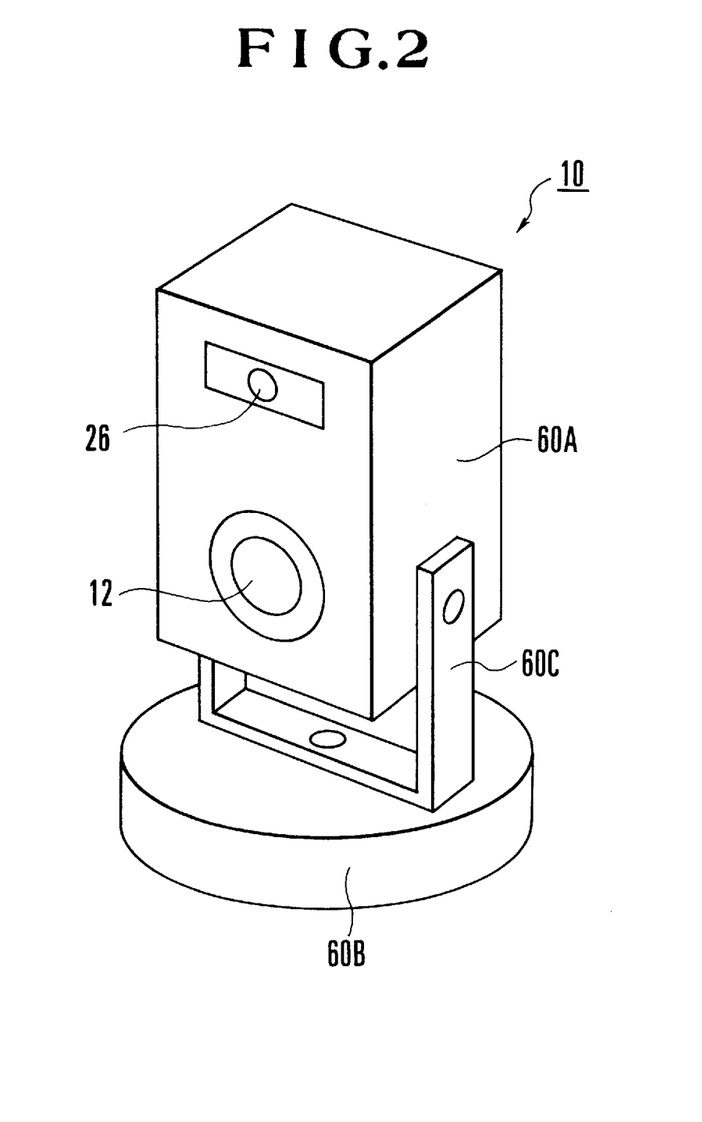
FIG. 2 is a perspective view of the exterior of the portion having a video camera 12 and a light emitting element 26.

FIG. 2 is a perspective view of the exterior of the remote-control apparatus 10, particularly, the portion in which the video camera 12 and the light emitting element 26 are formed as one unit.

In a body case 60A, the video camera 12 and the light emitting element 26 are disposed. Also, the body case 60A is tiltably supported by a supporting member 60C so that the body case 60A can be tilted relative to a mount 60B, and a tilting drive mechanism is housed inside the body case 60A. A panning drive mechanism is housed in the mount 60B so that the body case 60A can be panned via the supporting member 60C.

Figure 3:
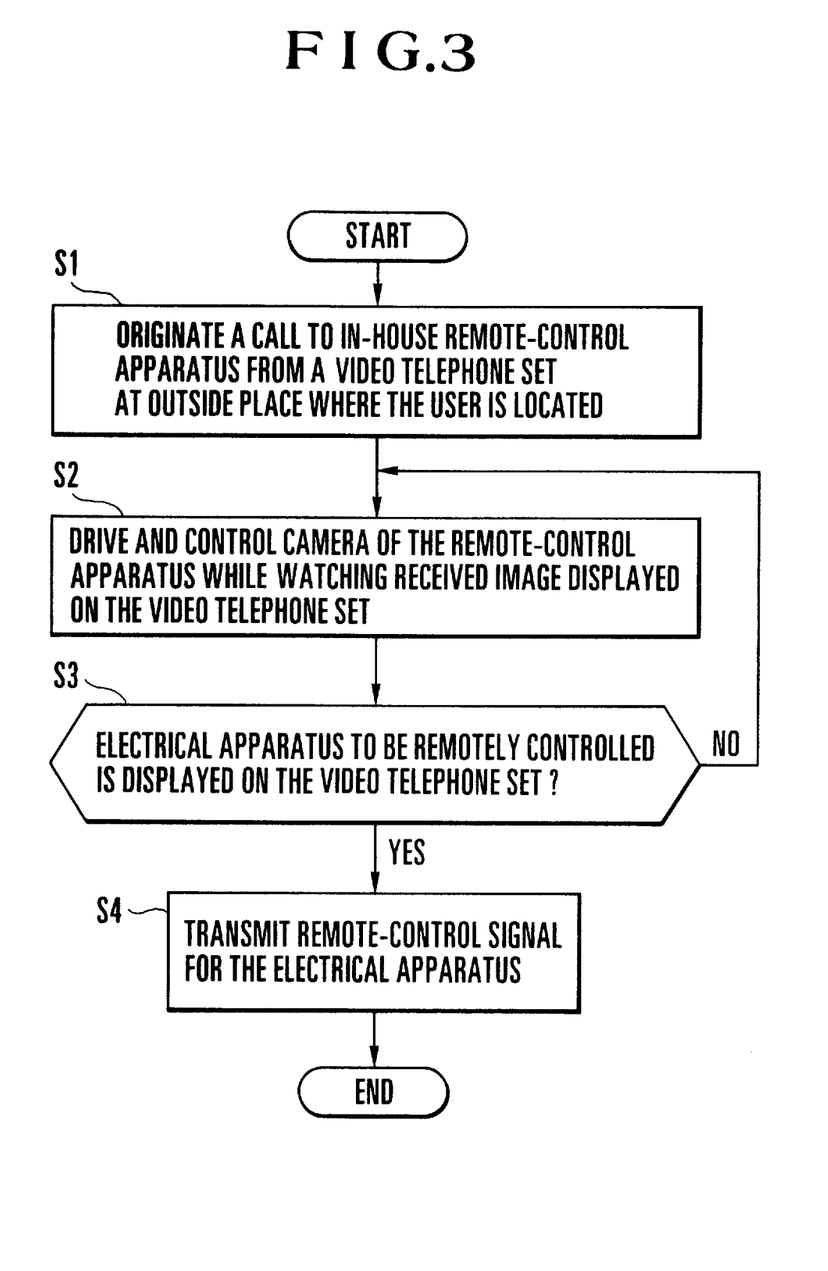
FIG. 3 is a flowchart illustrating the operation of the first embodiment of the present invention.

The operation of the first embodiment will be explained with reference to FIGS. 1 and 3 by using as an example a case in which an in-house electrical apparatus is remotely controlled at the outside place where the user is located. FIG. 3 is a flowchart illustrating the operation thereof.

The user originates a call from a video telephone set 32 at the outside place where the user is located to the in-house remote-control apparatus 10 (S1) via the communication line 30. The remote-control apparatus 10 inside the user's house responds to this call, and a mutual communication is established. An image taken by the video camera 12 of the remote-control apparatus 10 is displayed on a monitor screen 32a of the video telephone set 32 at the outside place where the user is located. The video camera 12 is remotely controlled while the user is watching the displayed image (S2).

To explain specifically, the video signal output from the video camera 12 is converted in a format by the video interface 14, after which a filtering and an encoding operation are performed on the signal by the video processing circuit 16. The video signal transmitting section 18a outputs the output of the video processing circuit 16 to the communication line 30 via the line interface 20. As a result, the situation inside the user's house is displayed on the monitor screen 32a of the video telephone set 32 at the outside place where the user is located.

At this point, a control signal, such as DTMF, for driving and controlling the video camera 12, i.e., a camera control signal, is transmitted from the video telephone set 32 at the outside place where the user is located to the remote-control apparatus 10 via the communication line 30 while the user is watching the monitor screen 32a. This camera control signal is supplied to the camera drive control circuit 28 via the line interface 20 and the control signal receiving section 18b. The camera drive control circuit 28 controls the orientation, zoom and focus of the video camera 12. Since the light emitting element 26 is formed integrally with the video camera 12, the camera drive control circuit 28 also controls the orientation of the light emitting element 26.

When an in-house electrical apparatus 100 to be remotely controlled is displayed on the video telephone set 32 at the outside place where the user is located (S3), the desired in-house electrical apparatus 100 is remotely controlled. To be specific, a remote control signal for the in-house electrical apparatus 100 to be controlled is transmitted to the remote-control apparatus 10 via the communication line 30 from the video telephone set 32 at the outside place where the user is located (S4). The remote control signal is supplied to the control signal receiving section 18b via the line interface 20.

The signal conversion circuit 22 converts the remote control signal which is input from the control signal receiving section 18b into a control signal for the in-house electrical apparatus 100 to be controlled, and the control signal is applied to the light emitting element 26 via the drive circuit 24. The light emitting element 26 emanates an infrared control signal toward the in-house electrical apparatus 100 to be controlled.

The first embodiment, in addition to the arrangement of the dedicated apparatus for remote control, can be realized by various apparatus arrangements, such as an automatic answering video telephone set or an automatic answering telephone set having a video camera. Also, the first embodiment can be realized by adding a remote control function to an image input apparatus.

It is clear that various communication media, such as an analog public switched telephone network (PSTN), ISDN or LAN, can be used as a communication line.

Although in the first embodiment the video processing circuit 16 for performing filtering or encoding on video signals is provided, the video processing circuit 16 is not an indispensable component of the present invention. Although the control signal receiving section 18b receives both the camera control signal and the control signal for remotely controlling a controlled apparatus, control signal receiving sections for receiving the respective signals separately may be provided. In addition, although the video camera 12 and the light emitting element 26 are formed as one unit in the first embodiment, they may be driven and controlled separately.

In the first embodiment, the camera drive control signal and the control signal for instructing a remote operation of the controlled apparatus are not limited to DTMF, but other formats, such as ISDN user-to-user information, may be used. The signal transmission medium through which the signals are transmitted from the remote-control apparatus 10 to the in-house electrical apparatus 100 in the first embodiment is not limited to an infrared ray, but visible light, an electromagnetic wave or an ultrasonic wave may be used.

As a matter of course, the electrical apparatuses which are remotely controlled, in addition to household electrical apparatuses and audio products, include various apparatuses such as OA apparatuses.

Figure 4:
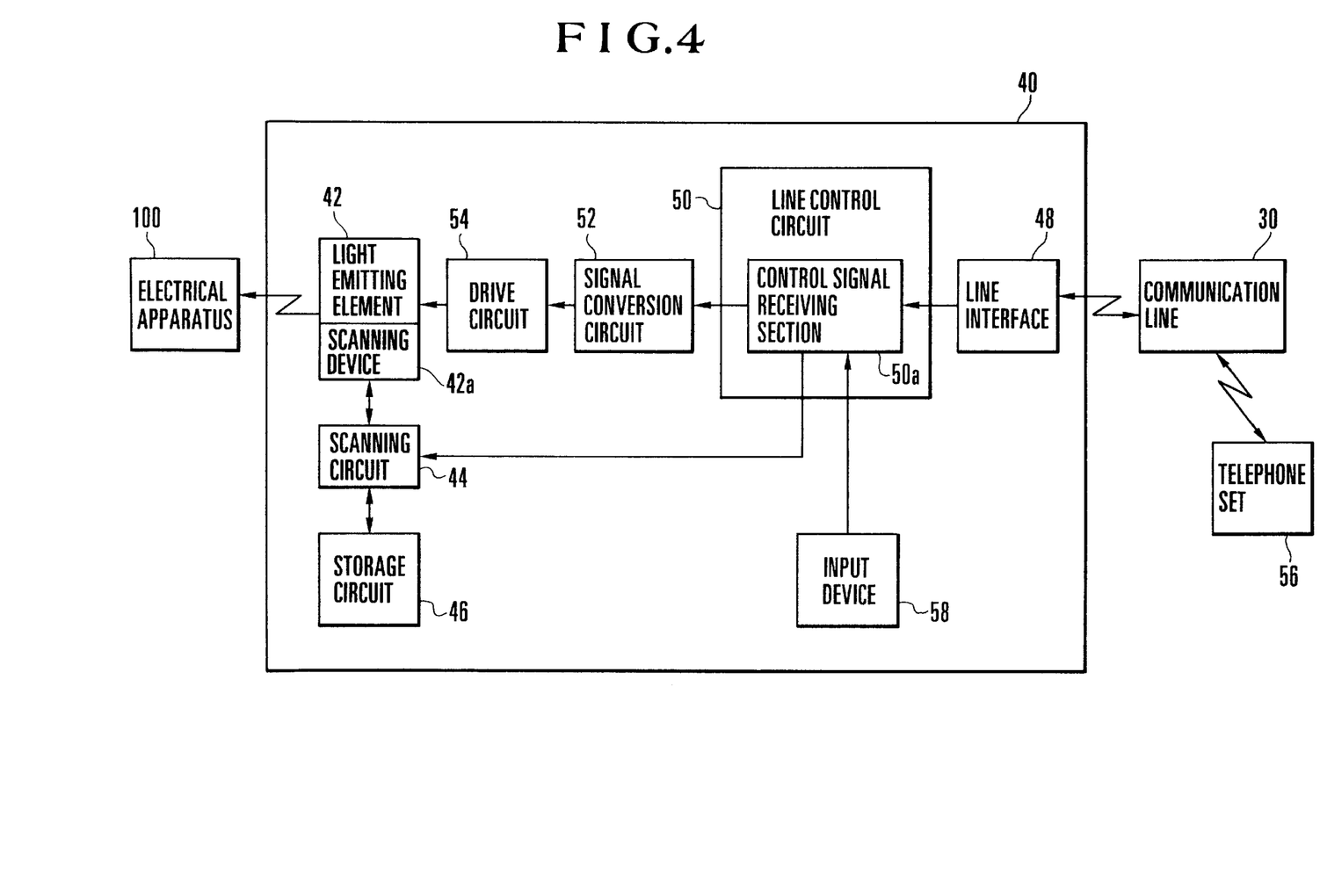
FIG. 4 is a block diagram illustrating the schematic construction of a second embodiment of the present invention.

Next, a second embodiment of the present invention will be explained. FIG. 4 is a block diagram illustrating the schematic construction of the second embodiment of the present invention.

Referring to FIG. 4, reference numeral 40 denotes a remote-control apparatus of the second embodiment, reference numeral 42 denotes a light emitting element for transmitting an infrared control signal to the electrical apparatus 100 which is a controlled apparatus, reference numeral 44 denotes a scanning circuit 44 for rotationally scanning the light emitting element 42 and changing the radiation direction of its output light, and reference numeral 46 denotes a storage circuit for storing the orientation of each electrical apparatus together with the identifier of the electrical apparatus.

Reference numeral 48 denotes a line interface through which a connection is made with the communication line 30, reference numeral 50 denotes a line control circuit for controlling communications over the communication line 30, which circuit comprises a control signal receiving section 50a for receiving various control signals, such as DTMF, from the communication line 30, reference numeral 52 denotes a signal conversion circuit for converting control signals from the communication line 30, specifically, control signals output from the control signal receiving section 50a, into a control signal format for the electrical apparatus 100 to be controlled, and reference numeral 54 denotes a drive circuit for driving the light emitting element 42 in accordance with the output from the signal conversion circuit 52.

Figure 5:
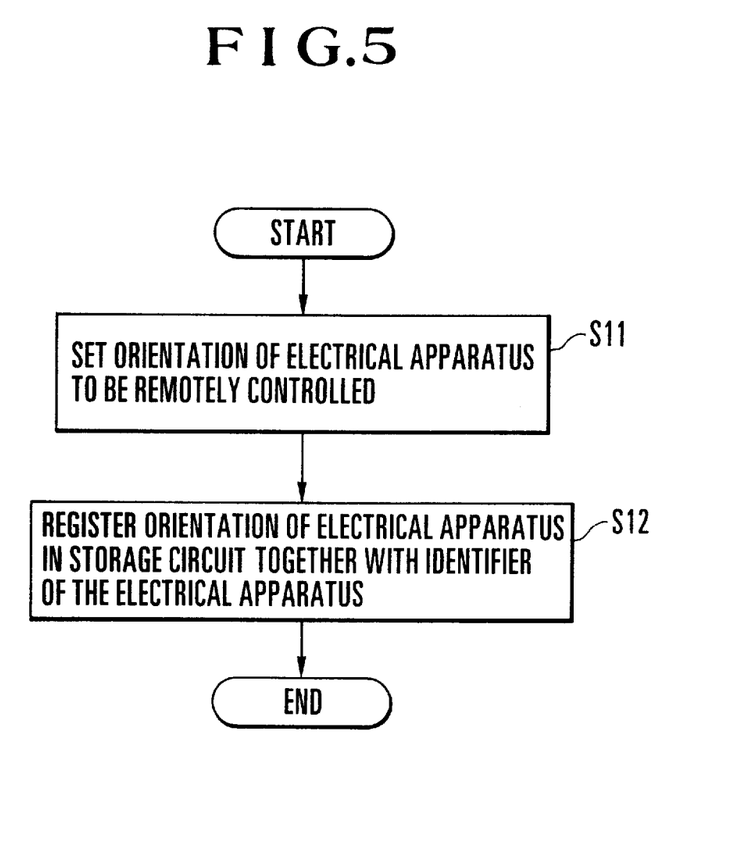
FIG. 5 is a flowchart of registering a controlled apparatus in accordance with the second embodiment of the present invention.

FIG. 5 is a flowchart of the operation in which the user registers the orientation of one or more in-house electrical apparatuses (controlled apparatuses) 100 or the remote-control apparatus 40. A scanning device 42a scans the radiation direction of the light emitting element 42 and sets the orientation of the in-house electrical apparatus to be controlled (S11). For example, the user manually instructs the orientation of the electrical apparatus 100 to be remotely controlled via an input device 58 of the remote-control apparatus 40, and the scanning device 42a directs the light emitting element 42 toward the instructed orientation. The user himself determines if the orientation is appropriate or not.

The determined orientation of the in-house electrical apparatus 100 to be controlled is registered in the storage circuit 46 together with the identifier of the in-house electrical apparatus 100 (S12). The identifier of the in-house electrical apparatus 100 may be mere consecutive numerals input, for example, via the input device 58.

When there are a plurality of electrical apparatuses 100 to be remotely controlled inside the user's house, the above-described operation is performed for each electrical apparatus. As a result, the identifiers of the plurality of in-house electrical apparatuses and the orientations of the in-house electrical apparatuses are registered in the storage circuit 46.

Figure 6:
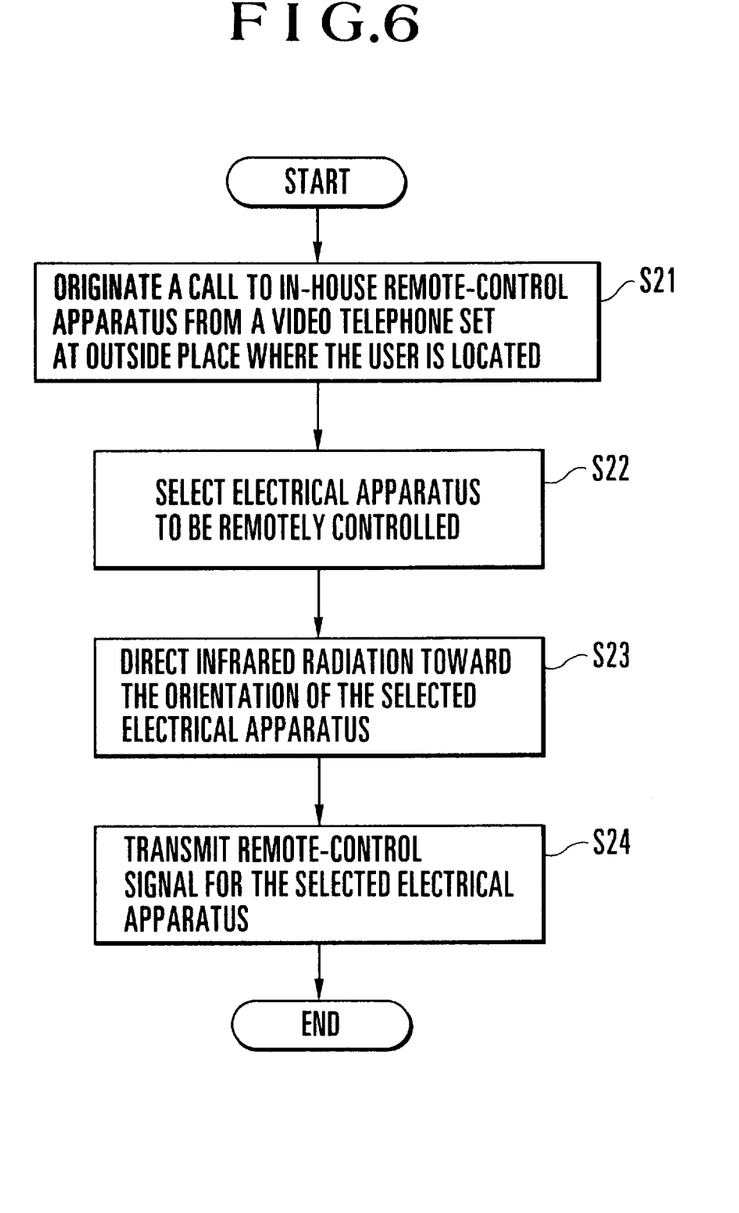
FIG. 6 is a flowchart of a remote operation in accordance with the second embodiment of the present invention.

FIG. 6 is a flowchart of a case in which an in-house electrical apparatus is remotely controlled from an outside place where the user is located.

The user originates a call to the remote-control apparatus 40 inside the user's house from a telephone set 56 at the outside place where the user is located (S21). When the remote-control apparatus 40 responds to this call, the user selects the in-house electrical apparatus 100 to be remotely controlled from the telephone set 56 at the outside place where the user is located (S22), and the remote-control apparatus 40, in response to this selection, directs the light emitting element 42 toward the selected in-house electrical apparatus 100 (S23).

Specifically, a control signal, such as DTMF, indicating the identifier of the in-house electrical apparatus 100 to be remotely controlled, is transmitted over the communication line 30 from the telephone set 56 at the outside place where the user is located. The control signal is applied to the scanning circuit 44 via the line interface 48 and the control signal receiving section 50a. The scanning circuit 44 reads out the orientation of the electrical apparatus 100 specified by the input control signal from the storage circuit 46, and the scanning device 42a is operated to cause the light emitting element 42 to rotate toward that orientation.

The user inputs a control signal for the selected in-house electrical apparatus 100 to the telephone set 56 at the outside place where the user is located. This input signal is transmitted through the communication line 30 based on DTMF and input to the signal conversion circuit 52 via the line interface 48 and the control signal receiving section 50a. The signal conversion circuit 52 converts the signal for a control operation from the outside place where the user is located into a signal format of the infrared control signal of the in-house electrical apparatus 100 to be controlled. The drive circuit 54 drives the light emitting element 42 in accordance with the output from the signal conversion circuit 52, that is, causes the light emitting element 42 to emit light. As a result, the infrared control signal is applied to the selected in-house electrical apparatus 100, and the in-house electrical apparatus 100 is remotely controlled.

In the second embodiment, the scanning device 42*a* is rotated to direct the light emitting element 42 toward the orientation of the specified electrical apparatus 100. However, a plurality of light emitting elements 42 may be provided, and the orientations of the plurality of light emitting elements 42 are made different. The scanning circuit 44 may be used to switch the plurality of light emitting elements 42, and thus the same operation as in the second embodiment can be performed.

The second embodiment, in addition to the arrangement of the dedicated apparatus for remote control, can be realized by various apparatus arrangements, such as an automatic answering video telephone set or an automatic answering telephone set having a video camera. It is clear that various communication media, such as an analog public switched telephone network (PSTN), ISDN or LAN, can be used as a communication line. The method of registering the orientation of a controlled apparatus, in addition to a manual setting in accordance with an orientation instruction by the user, may be other methods, such as automatic detection by which signals from each controlled apparatus are detected.

Although in the second embodiment the orientation of the controlled apparatus is specified by specifying the identifier of the controlled apparatus to be remotely controlled, the orientation of the controlled apparatus to be remotely controlled may be specified directly. The identifier of the controlled apparatus, in addition to mere numerals, may be the name of the controlled apparatus. For example, a menu showing a list of the controlled apparatuses may be displayed on the apparatus at the outside place where the user is located so that a selection can be made from the list. Although the control signal receiving section 50*a* is designed to receive both the control signal for specifying the orientation or the identifier of the controlled apparatus and the control signal for remotely controlling the controlled apparatus, control signal receiving sections (50*a*) for separately receiving the respective signals may be disposed.

In the second embodiment, the control signal for specifying the identifier and the orientation of the controlled apparatus and the control signal for instructing a remote operation of the controlled apparatus are not limited to DTMF, but other formats, such as ISDN user-to-user information, may be used. The signal transmission medium through which the signals are transmitted from the remote-control apparatus 40 to the controlled apparatus in the second embodiment is not limited to an infrared ray, but visible light, an electromagnetic wave or an ultrasonic wave may be used.

As a matter of course, the electrical apparatuses which are remotely controlled, in addition to household electrical apparatuses and audio products, include various apparatuses such as OA apparatuses.

In the foregoing, the embodiment in which a remote operation is performed is explained. As a prerequisite of the remote operation, means for knowing the operating state of the controlled apparatus is necessary occasionally. It is clear that the present invention can be applied to the apparatus for detecting or monitoring the operating state of the controlled apparatus. For this purpose, for example, state notification means for notifying the state from the controlled apparatus to the remote-control apparatus 10 or 40 may be disposed.

As can be easily understood from the above explanation, according to theses embodiments, it is possible to obtain the following advantages. Since the image input means and the image transmitting means for transmitting an image input by the image input means to the communication line are provided, it becomes possible to monitor the controlled apparatus in the form of a video image form a remote location. Thus, the operation of the controlled apparatus can be easily confirmed at the remote location before and after the remote operation.

In addition, since the drive control means for driving and controlling the image input means and the control signal receiving means for receiving the control signal for the drive control means over the communication line are provided, it becomes possible to monitor the plurality of controlled apparatuses to be remotely controlled in the form of a video image form the outside place where the user is located. Thus, the positions of the plurality of controlled apparatuses to be remotely controlled can be easily confirmed at the remote location.

Since (1) the remote control signal transmitting means for transmitting a remote control signal to a controlled apparatus (2), the transmission destination control means for controlling the direction in which the remote control signal is transmitted, which signal is transmitted by the remote control signal transmitting means, and (3)control signal receiving means for receiving control signals for the transmission destination control means over a communication line are provided, it is possible to selectively transmit the control signals to an arbitrary controlled apparatus which is present in a predetermined range.

Since (1) the image input means (2), the image transmitting means for transmitting an image input by the image input means to a communication line (3), the drive control means for deriving and controlling the image input means, (4) the first control signal receiving means for receiving a first control signal for the drive control means over the communication line, (5) the second control signals receiving means for receiving a second control signal for instructing a remote operation for the one or more controlled apparatuses over the communication line, (6) the signal conversion means for converting the second control signal received by the second control signal receiving means into a remote control signal for the one or more controlled apparatuses, and the (7) remote-control signal output means for outputting a remote control signal converted by the signal conversion means are provided, it is possible to remotely control a plurality of controlled apparatuses separately while monitoring the plurality of controlled apparatuses to be remotely controlled in the form of a video image.

In addition, since the image input means and the remote-control signal output means are formed integrally and since the drive control means controls not only the image input means but also the direction in which the remote control signal is output by the remote control signal output means, it is possible to accurately select a controlled apparatus to be remotely controlled.

Since the remote-control signal output method for outputting a wireless remote control signal for remotely controlling one or more controlled apparatuses is provided in the image input apparatus, it is possible to remotely control the controlled apparatuses while confirming the controlled apparatuses in the form of an input image.

Since (1) the orientation storing means for storing the orientations of the one or more controlled apparatuses, (2) the remote-control signal output means for outputting a remote control signal for the controlled apparatuses, and (3) orientation change means for changing the orientation of the output of the remote-control signal output means to the orientation of the controlled apparatus to be controlled by referring to the orientation storing means in accordance with the selection of the controlled apparatus to be controlled are provided, it becomes possible to select as desired a plurality of controlled apparatuses which are arbitrarily oriented and to remotely control them.

Further, since the orientation storing means stores information indicating the orientations of the controlled apparatuses together with the identifiers of the controlled apparatuses and since the direction change means changes the direction of the output of control signal output means to the orientation of the controlled apparatus, corresponding to the identifier of the identifier information, in accordance with the identifier information received over the communication line, the selection of the controlled apparatuses becomes easier.

In addition, since the remote-control signal receiving means for receiving a remote control signal for specifying a controlled apparatus and the operation thereof over the communication line and the signal conversion means for converting a signal indicating at least the control contents of the remote control signal received by the remote control signal receiving means into a signal format corresponding to the controlled apparatus to be controlled and for applying the signal to the remote control signal output means are provided, it becomes possible to remotely control a plurality of controlled apparatuses as desired.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications, equivalent structures and functions.

What is claimed is:

1. A remote-control apparatus for remotely controlling a plurality of controlled apparatuses, comprising:
   (a) image input means for inputting images of said controlled apparatuses;
   (b) control means for controlling each controlled apparatus the image of which has been input by said image input means, said control means including a signal transmitting section for transmitting an optical signal for controlling the to-be-controlled apparatuses, the transmitting direction of the optical signal being the same as an image pickup direction of the image input means;
   (c) means for changing the image pickup direction of the image input means; and
   (d) image transmitting means for outputting the images input by said image input means to outside the remote-control apparatus.

2. A remote-control apparatus according to claim 1, wherein said image transmitting means can be connected to a communication line.

3. A remote-control apparatus according to claim 1, wherein said transmitting section is portable jointly with said image input means.

4. A remote-control apparatus according to claim 3, wherein said transmitting section and said image input means are disposed in one body.

5. A remote-control apparatus according to claim 1, further comprising:
   drive control means for driving and controlling said image input means; and
   control signal receiving means for receiving a control signal for said drive control means from outside the remote-control apparatus.

6. A remote-control apparatus according to claim 5, wherein said control signal receiving means can be connected to a communication line.

7. A remote-control apparatus for remotely controlling a plurality of controlled apparatuses by using an optical signal, comprising:
   (a) image input means for inputting images of said controlled apparatuses;
   (b) image transmitting means for outputting the images input by said image input means to outside the remote-control apparatus;
   (c) drive control means for driving and controlling said image input means including changing an image pickup direction of the image input means;
   (d) first receiving means for receiving a first control signal for said drive control means from outside the remote-control apparatus;
   (e) second receiving means for receiving a second control signal for instructing a remote operation for said plurality of controlled apparatuses from outside the remote-control apparatus;
   (f) conversion means for converting the second control signal received by said second receiving means into a remote-control signal for said plurality of controlled apparatuses; and
   (g) output means for outputting the remote control signal converted by said conversion means in the form of an optical signal, said optical signal of said output means having a transmitting direction which is the same as the image input direction of the image pickup means.

8. A remote-control apparatus according to claim 7, wherein said remote-control apparatus is connected to another apparatus through a communication line.

9. A remote-control apparatus according to claim 7, further comprising a body case in which said image input means and said output means are housed.

10. A remote-control apparatus according to claim 9, wherein said drive control means controls the direction in which an image is input by said image input means and the direction in which the signal is output by said output means.

11. A system for remote control of a plurality of controlled apparatuses situated at a first location, comprising:
   (a) image pickup means at said first location for viewing said controlled apparatuses and generating image signals indicative thereof;
   (b) signal transmission means for conveying said generated image signals to a second location remote from said first location;
   (c) display means at said second location for displaying images in said image signals;
   (d) first control means at said second location for controlling said image pickup means to so change its viewing relation with said controlled apparatuses as to convey an image signal through said signal transmission means of an image signal indicative of a selected one of said controlled apparatuses;

(e) second control means at said second location for generating a control signal for said selected one of said controlled apparatuses; and (f) conversion means for converting the control signal into an optical remote control signal for said selected one of said control apparatuses, said optical remote control signal having a transmitting direction which is the same as an image pickup direction of the image pickup means.

* * * * *